(12) United States Patent  
Green

(10) Patent No.: US 9,358,625 B2  
(45) Date of Patent: Jun. 7, 2016

(54) HACK SAW WITH INTEGRATED RETAINER FOR BLADE PIN HOLDER AND RELATED METHOD

(71) Applicant: IRWIN INDUSTRIAL TOOL COMPANY, Huntersville, NC (US)

(72) Inventor: Matthew C. Green, Amherst, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 415 days.

(21) Appl. No.: 13/828,369

(22) Filed: Mar. 14, 2013

(65) Prior Publication Data

US 2014/0259702 A1    Sep. 18, 2014

(51) Int. Cl.
| | |
|---|---|
| *B23D 51/10* | (2006.01) |
| *B23D 51/12* | (2006.01) |
| *B23D 51/14* | (2006.01) |

(52) U.S. Cl.  
CPC .............. *B23D 51/12* (2013.01); *B23D 51/10* (2013.01); *B23D 51/14* (2013.01); *Y10T 29/49826* (2015.01)

(58) Field of Classification Search  
CPC ...... B23D 49/12; B23D 51/125; B23D 51/14; B23D 51/10; B23D 51/12  
See application file for complete search history.

(56) References Cited

U.S. PATENT DOCUMENTS

| | | | |
|---|---|---|---|
| 2,612,196 A | 9/1952 | Bouschor | |
| 2,691,396 A | 10/1954 | Harrison | |
| 3,173,461 A | 3/1965 | Johnson | |
| 3,822,731 A | 7/1974 | Keymer | |
| 6,216,350 B1 | 4/2001 | Kirk | |
| 6,266,887 B1* | 7/2001 | Owens | B23D 49/12 30/506 |
| 2009/0113729 A1* | 5/2009 | Chen | 30/513 |
| 2010/0132203 A1 | 6/2010 | Green et al. | |
| 2014/0000117 A1 | 1/2014 | Novak et al. | |
| 2014/0259703 A1 | 9/2014 | Green et al. | |

* cited by examiner

*Primary Examiner* — Sean Michalski  
*Assistant Examiner* — Liang Dong  
(74) *Attorney, Agent, or Firm* — Sutherland Asbill & Brennan LLP

(57) ABSTRACT

A hack saw comprises a proximal end, a proximal handle located at the proximal end, and a distal end spaced from the proximal handle for mounting a hack saw blade therebetween. The handle includes a proximal cavity at a base end thereof, dimensioned to allow a portion of a proximal pin holder therethrough, and a proximal pin holder retaining member within the proximal handle proximally spaced from the proximal cavity, defining a slot therebetween for retention of a pin holder therein. The pin holder retaining member is positioned to form an interference with the proximal pin holder when the pin holder is located in the handle and prevents the proximal pin holder from dislodging or being removed therefrom.

24 Claims, 3 Drawing Sheets

HACK SAW WITH INTEGRATED RETAINER FOR BLADE PIN HOLDER AND RELATED METHOD

FIELD OF THE INVENTION

The present invention relates to hack saws and, more particularly, to hack saws with integrated mechanisms for retaining a hack saw blade pin holder therein.

BACKGROUND OF THE INVENTION

Conventional hack saw frames generally have a proximal handle (closer to a user's hand), a distal portion (farther from a user's hand, relative to the proximal handle), and an elongate upper frame arm extending between the upper ends of proximal handle and distal portion. The hack saw defines a generally planar shape. Each handle defines a mounting slot/cavity adjacent a lower end thereof, through which projects a blade mounting pin holder, for releasably mounting a hack saw blade therebetween. Tension is applied to the blade, via the pin holders to keep the blade rigid and assist in straighter cuts and longer blade life.

When a mounted hack saw blade requires adjustment or replacement thereof, it is released from the mounting pin holders. Typically, the proximal pin holder is separable from the proximal handle. Thus, when the tension applied to the hack saw blade is released, to, in turn, dismount the blade, the proximal pin holder can slip out of the cavity of the proximal handle and dislodge/separate from the proximal handle. Such separation is a nuisance to the user while adjusting or replacing the blade, as it renders the process more difficult and/or time consuming. Further, during storage of the hack saw, the pin holder may dislodge from the frame, and get lost.

In an attempt to alleviate this problem, some saws have a rubber O-ring placed onto the distal end of the proximal pin holder after insertion through the slot/cavity of the proximal handle to restrict movement of the pin holder and prevent it from slipping back out of the cavity of the handle and thus dislodging of the hack saw frame. However, one drawback associated with this approach is that the O-ring may sever or otherwise separate from the pin holder, and the pin holder can dislodge from the proximal handle thereafter.

In another attempt to alleviate this problem, the proximal pin holder is deformed after insertion through the slot/cavity of the proximal handle, such that the post-deformation dimensions of the pin holder prevent it from sliding out of the cavity. One drawback associated with this approach is the extra step in the manufacturing process, i.e., the step of deforming the pin holders, thereby increasing cost of assembly and ultimately retail cost for the end user.

SUMMARY OF THE INVENTION

It is an object of the present invention to overcome one or more of the above-described drawbacks and/or disadvantages of the known hack saw blades.

In accordance with a first aspect, a hack saw comprises a proximal end, a proximal handle located at the proximal end, and a distal end spaced from the proximal handle for mounting a hack saw blade therebetween, said handle including a proximal cavity at a base end thereof, dimensioned to allow a portion of a proximal pin holder therethrough, and a proximal pin holder retaining member within the proximal handle proximally spaced from the proximal cavity, defining a slot therebetween for retention of a pin holder therein. The pin holder retaining member is positioned to form an interference with the proximal pin holder when the pin holder is located in the handle and prevents the proximal pin holder from dislodging or being removed therefrom.

In some embodiments, the slot defines a length less than a length of the pin holder, to, in turn, form the interference. In some such embodiments, the retaining member is at least one of resiliently movable and compressible between a first position where the retaining member forms said interference and the pin holder is not insertable into the slot, and a second position sufficiently proximally displaced from the first position to allow the pin holder to be inserted into the slot.

In some embodiments, the proximal handle comprises a proximal hand grip and a hand guard distally spaced therefrom, the hand grip and hand guard are connected at a base end by an elongate retaining arm, and the pin holder retaining member is located within the elongate retaining arm. In some such embodiments, the retaining arm defines opposing sidewalls and a base thereof and the retaining member at least one of (i) extends from one sidewall toward the opposing side wall and (ii) extends upward from the base.

In some embodiments, the pin holder retaining member comprises a retaining wall integrally formed with the retaining arm. In some embodiments, the proximal cavity is dimensioned to allow a distal portion of the pin holder to project therethrough and to prevent a proximal portion of the pin holder from passing therethrough.

In some embodiments, the proximal handle further comprises an alignment member located within the slot, configured to align the proximal pin holder in a direction substantially parallel to the sidewalls of the retaining arm. In some such embodiments, the alignment member comprises a pair of opposing projections projecting from respective opposing sidewalls of the slot inwardly into the slot and forming a gap therebetween configured to receive the proximal pin holder therein. In some such embodiments, the gap is sized and shaped to substantially allow rotation of the proximal pin holder when a distal portion of the pin holder is located therein and substantially prevent rotation of the proximal pin holder when a proximal portion of the pin holder is located therein.

In some embodiments, the hack saw further comprises a proximal pin holder and a distal pin holder. In some such embodiments, the hack saw further comprises a hack saw blade.

In accordance with another aspect, a hack saw comprises a proximal end, a proximal handle located at the proximal end, and a distal end spaced from the proximal handle for mounting a hack saw blade therebetween, said handle including a proximal cavity at a base end thereof, dimensioned to allow a portion of a proximal pin holder therethrough, and first means for retaining the pin holder in the handle. The first means is positioned to form an interference with the proximal pin holder when the pin holder is located in the handle and prevents the proximal pin holder from dislodging or being removed therefrom. In some embodiments, the first means is a pin holder retaining member formed within the proximal handle.

In accordance with another aspect, a method comprises the steps of providing a hack saw frame having a proximal end, a proximal handle located at the proximal end, and a distal end spaced from the proximal handle for mounting a hack saw blade therebetween, said handle including a proximal cavity at a base end thereof, dimensioned to allow a portion of a proximal pin holder therethrough, and a proximal pin holder retaining member within the proximal handle proximally spaced from the proximal cavity, defining a slot therebetween for retention of a pin holder therein; wherein the pin holder retaining member is positioned to form an interference with the proximal pin holder when the pin holder is located in the handle and prevents the proximal pin holder from dislodging or being removed therefrom, and assembling a proximal pin holder having a mounting pin projecting from a distal portion thereof into the proximal handle of the hack saw frame.

In some embodiments, the assembling step comprises inserting a distal portion of the proximal pin holder into the proximal cavity, proximally moving the retaining member from a first position where the retaining member forms said interference and the pin holder is not insertable into the slot to a second position sufficiently displaced from the first position to allow the pin holder to be inserted into the slot, and inserting the remainder of the pin holder into the slot.

In some such embodiments, the method further comprises the steps of assembling to the distal portion of the hack saw frame a distal pin holder having a blade mounting pin projecting from a proximal portion thereof, mounting a hack saw blade to the hack saw via engagement with the mounting pins of the proximal and distal pin holders, and applying tension to the hack saw blade. In some such embodiments, the method further comprises the step of substantially preventing at least one of the proximal and distal pin holders from rotating.

In some embodiments, the retaining member comprises a retaining wall integrally formed with the retaining arm.

Objects and advantages of the present invention, and/or of the currently preferred embodiments thereof, will become more readily apparent in view of the following detailed description of the currently preferred embodiments and accompanying drawings.

DETAILED DESCRIPTION OF EMBODIMENTS OF THE INVENTION

Figure 1:
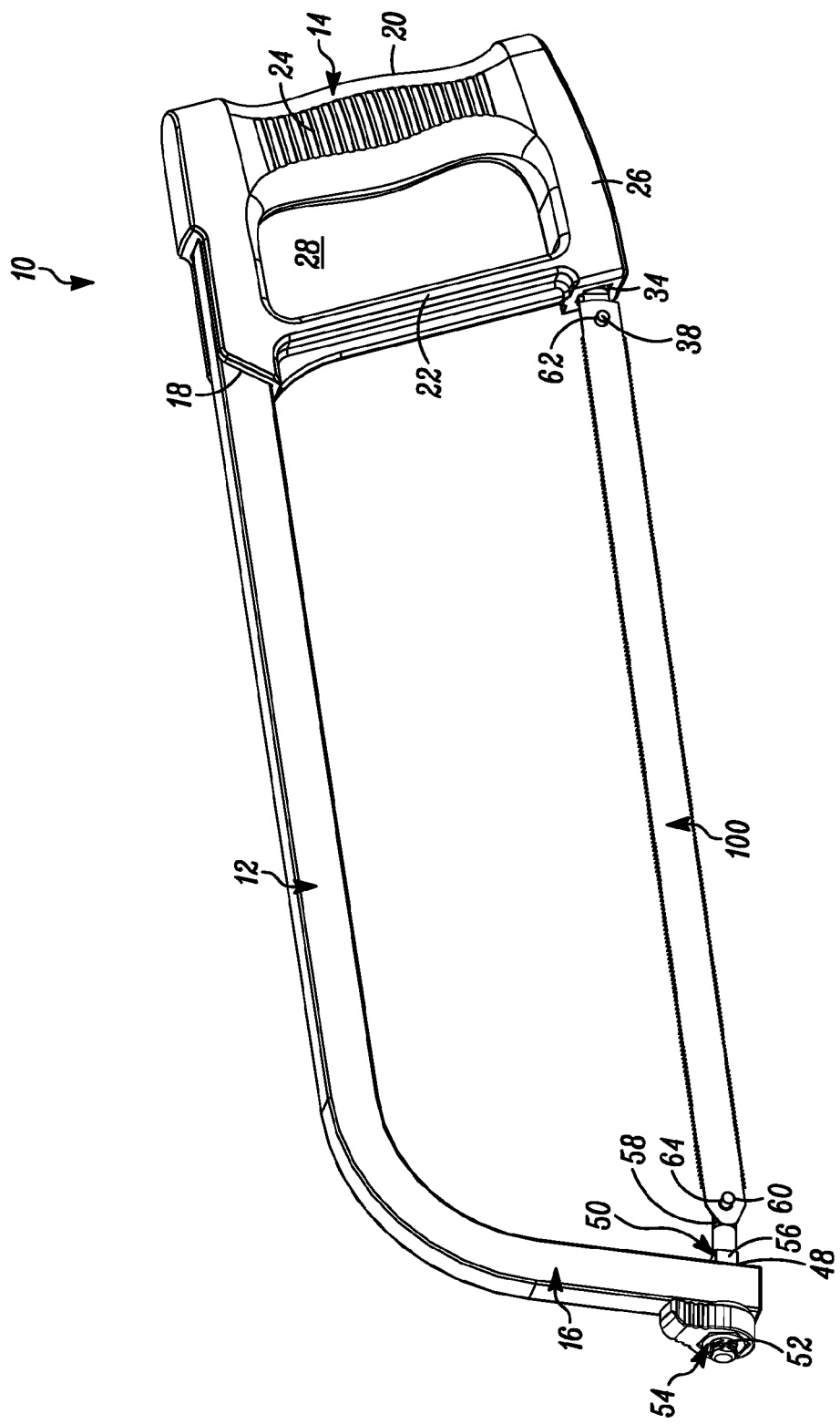
FIG. 1 is a perspective side view of a hack saw frame.
Figure 2:
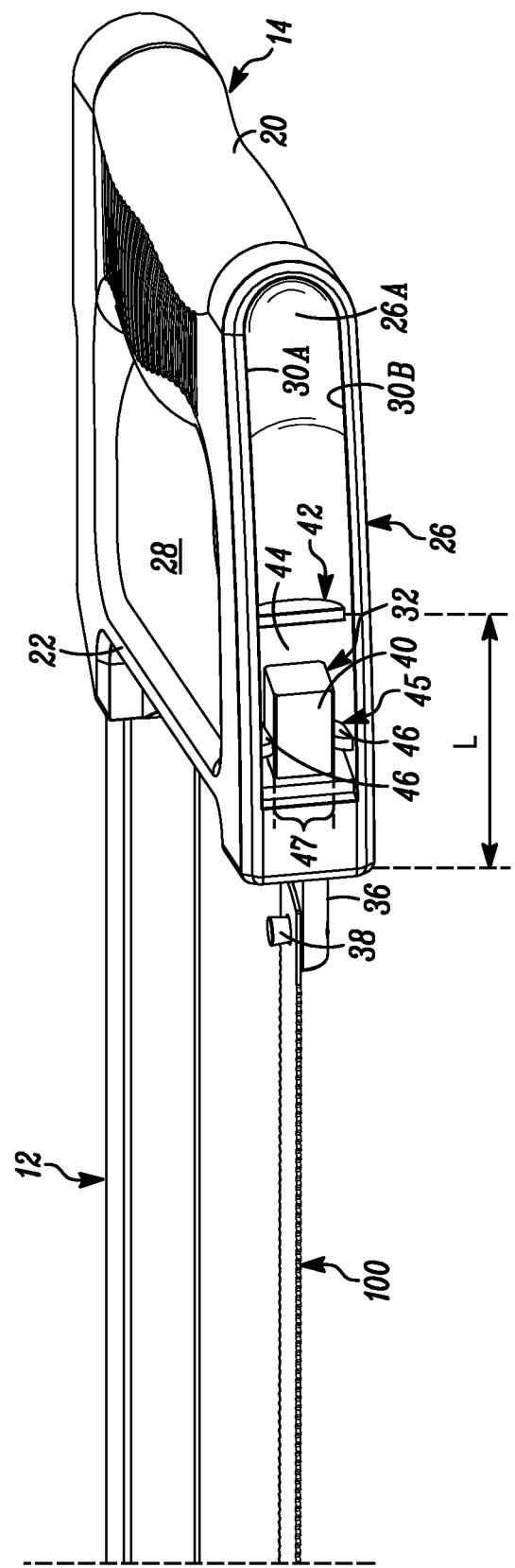
FIG. 2 is a perspective bottom view of the hack saw frame of FIG. 1.
Figure 3:
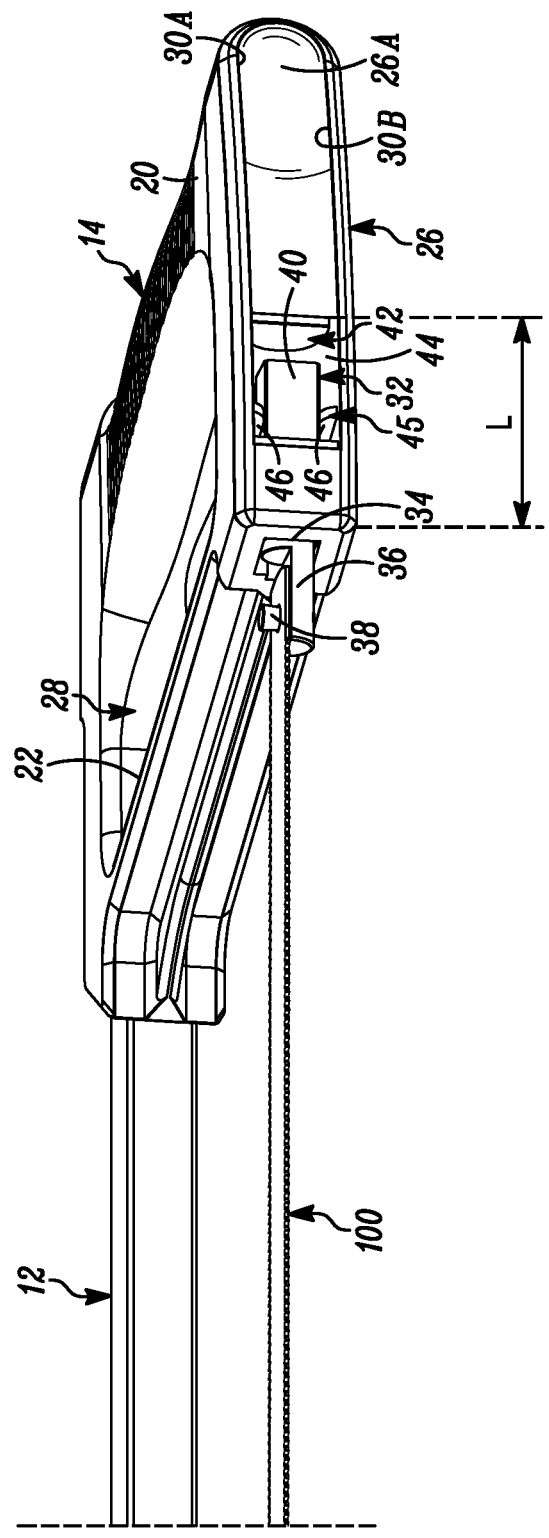
FIG. 3 is another perspective bottom view of the hack saw frame of FIG. 1.

In FIG. 1, a hack saw is indicated generally by the reference numeral 10. The hack saw 10 is usable with an elongate hack saw blade 100 configured to cut through an intended work piece. One exemplary hack saw blade is disclosed in U.S. patent application Ser. No. 13/799,546, filed Mar. 13, 2013, entitled "Double Sided Hand Hack Saw Blade and Method of Manufacture," which, in turn, claims the benefit of similarly titled U.S. Provisional Patent Application Ser. No. 61/666,724, filed Jun. 29, 2012, which are hereby expressly incorporated by reference in their entireties as part of the present disclosure. As shown in FIGS. 1 through 3, the hack saw 10 is defined by a frame having an elongate upper frame arm 12, a proximal handle 14 extending downwardly from a proximal end of the frame arm 12, and a distal portion 16 extending downwardly from a distal end of the frame arm 12.

In the illustrated embodiment, as shown in FIG. 1, the distal portion 16 is integrally formed with the elongate frame arm 12. Also in the illustrated embodiment, the proximal handle 14 defines a frame arm opening or slot 18 at an upper end thereof that is shaped and dimensioned to slidably receive therein the proximal end of the upper frame arm 12 and secure the upper frame arm therein. A glue (not shown) is applied to the contacting interfaces of the upper frame arm 12 and frame arm opening 18 to fixedly secure the upper frame arm 12 and proximal handle 14 to one another. However, as should be recognized by those of ordinary skill in the pertinent art based on the teachings herein, any of numerous other fixation means may be employed for securing the upper frame arm 12 to the proximal handle 14, such as, for example, via welds, rivets, screws, nails, other fasteners, clips, or by molding or co-molding. One such example is disclosed in pending U.S. patent application Ser. No. 12/626,377, filed on Nov. 25, 2009, entitled "Hacksaw with Blade Tensioning Mechanisms," which, in turn, claims the benefit of similarly titled U.S. Provisional Patent Application Ser. No. 61/118,573, filed Nov. 28, 2008, each of which is hereby expressly incorporated by reference in its entirety as part of the present disclosure.

The proximal handle 14 includes a proximal hand grip 20 extending downwardly from the proximal end of the elongate frame arm 12, and a hand guard 22 spaced distally relative to the proximal hand grip 20 and similarly extending downwardly from the elongate frame arm 12. A gripping surface 24 is formed on the hand grip 20 and provides a ribbed and/or cushioned surface to facilitate manual gripping of the proximal handle 14. In some embodiments, the gripping surface 24 may be formed of rubber or a similar elastomeric material, or if desired, of a hard plastic or metal. However, as should be recognized by those of ordinary skill in the pertinent art, the gripping surface 24 may be formed of any of numerous different materials, and may take the form of any of numerous different surface configurations, that are currently known, or that later become known.

The hand grip 20 and the hand guard 22 of the proximal handle 14 are connected at an upper end by the elongate frame arm 12 and at the opposing bottom end by a pin holder retaining arm 26 extending therebetween. The hand grip 20 and hand guard 22 define a grip cavity 28 therebetween. The proximal handle 14 is sized, i.e., the length of the hand grip 20 and the hand guard 22, and the spacing 28 therebetween, and shaped such that a user can manually grasp the hand grip 20 with sufficient clearance between the user's hand (or fingers) and the hand guard 22. Thus, the grip cavity 28 is shaped and dimensioned to slidably receive therein a user's hand. To properly hold the hack saw 10, a user slides his hand through grip cavity 28 and wraps his fingers around the hand grip 20. In use, a user manually grasps the hand grip 20 and applies push and pull strokes to the hack saw 10 to cut through a work piece. The hand guard 22 protects the user's hand from the work piece, debris or the like when the hack saw 10 is in use.

As shown in FIGS. 2 and 3, the elongate pin retaining arm 26 defines parallel opposing sidewalls 30a, 30b forming a substantially hollow cavity 26a therebetween. The retaining arm 26 is configured, i.e., sized and shaped, to receive therein a proximal blade pin holder 32 for mounting a proximal end of a hack saw blade 100 thereto. The pin holder 32 may be a conventional pin holder as known by one of ordinary skill in the art. Alternatively, the pin holder 32 may have a different configuration, such as, for example, as disclosed in co-pending U.S. Patent Application entitled "Retained Aligning Rotating Hack Saw Blade Tensioning Mechanism and Related Method," filed on even date herewith, which is hereby expressly incorporated by reference in its entirety as part of the present disclosure. The retaining arm 26 defines a proximal pin holder cavity 34 at a distal end thereof (which coincides with the lower end of the hand guard 22). The proximal pin holder cavity 34 is sized and shaped to allow passage therethrough of at least a distal portion 36 of the proximal pin holder 32, including a blade mounting pin 38 projecting therefrom to mount a blade 100 thereon. A proximal portion 40 of the pin holder 32 is configured, e.g., sized and shaped relative to the cavity 34, so as to prevent passage therethrough of the proximal portion 40. Thus, when the proximal pin holder 32 is assembled into the proximal handle 14, the proximal portion 40 of the pin holder 32 is located within the substantially hollow retaining arm 26, and the distal portion 36 of the pin holder 32 may project out through the cavity 34.

In the illustrated embodiment, the distal portion 36 of the proximal pin holder 32 is semi-circular in shape and the proximal portion 40 is substantially rectangular in shape. The proximal pin holder cavity 34 is rectangular. The pin holder 32 and pin holder cavity 34 are configured such that the diameter of the distal portion 36 is smaller than the smallest dimension of the cavity 34. The length of the mounting pin 38 is also dimensioned so that it can pass through the cavity 34. Thus, the distal portion 36 may extend through the cavity 34. Conversely, the proximal portion 40 of the pin holder 32 is dimensioned such that its smallest dimension is larger than the largest dimension of the cavity 34. Thus, the proximal portion 40 may not extend through the cavity 34 and allows the pin holder 32 to act as a mounting point for the blade when placed under tension for cutting. As should be understood by those of ordinary skill in the pertinent art, however, the distal and proximal portions 36, 40 of the proximal pin holder 32, and the proximal pin holder cavity 34 may define any of numerous different corresponding shapes and configurations that will permit passage/projection of the distal portion 36 of the proximal pin holder 32 through the cavity 34 and prevent passage of the proximal portion 40 of the proximal pin holder 32 therethrough.

As shown in FIGS. 2 and 3, the elongate pin holder retaining arm 26 also includes a retaining member 42. In some embodiments, the retaining member 42 extends substantially perpendicularly from one sidewall 30a, 30b, toward the other sidewall 30a, 30b. In the illustrated embodiment, the retaining member 42 extends from one sidewall to the other. Alternatively, in other embodiments, the retaining member 42 may extend vertically from the base 26a of the retaining arm 26 without being attached to either of the sidewalls 30a or 30b. A slot 44 is located between the retaining member 42 and the cavity 34.

The retaining member 42 creates a dimensional interference between the proximal pin holder 32 and the retaining member 42 when the pin holder 32 is assembled, i.e., inserted, into the slot 44. The retaining member 42 is positioned within the retaining arm 26 to create the interference. That is, the retaining member 42 is positioned such that the length L of the slot 44 is shorter than the length of the pin holder 32. Therefore, the retaining member 42 substantially prevents the inserted pin holder 32 from being fully removed proximally out of the cavity 34 and dislodging, or otherwise separating, from the proximal handle 14 after initial insertion therein. This is so regardless of whether or not a hack saw blade 100 is mounted to the frame, or when tension is applied to the blade 100. For example, the pin holder 32 will not dislodge from the frame during adjustments and/or replacement of a hack saw blade 100, or when the hack saw frame is stored away without a blade mounted.

The retaining member 42, however, permits insertion of the pin holder 32 into the slot 44 in the following manner. The retaining member 42 is configured, i.e., the location, material, and properties of the retaining member 42 are selected, such that a force applied by a user thereto in a proximal direction, i.e., away from the cavity 34, can temporarily overcome the interference created by the retaining member 42. In the illustrated embodiment, at least a portion of the member 42 is deflectable or bendable away from its original position/form so as to temporarily increase the length L of the slot 44 to be long enough to allow complete insertion of the pin holder 32 into the slot 44 for insertion of the pin holder 32 into and through the cavity 34. In at least some embodiments, the user can, for example, deflect the member 42 proximally with fingers or with a tool. By way of example only, a force in the range of about 2 to about 20 pounds adequately secures the pin holder but allows such manual deflection of the retaining member. It should be understood, however, that the retaining member 42 may be deflected in any suitable manner, such as by a machine, and be designed such that a lesser or greater amount of force is required to deflect it.

Once the pin holder 32 is inserted into the slot 44, and the force applied to the retaining member 42 is terminated, the retaining member 42 returns to its original position/form, establishing an interference between the inserted proximal pin holder 32 and the pin holder retaining member 42, as explained above. One of ordinary skill in the art should appreciate that the location, materials, and properties of the retaining member 42 can be selected to maximize the amount of interference between the retaining member 42 and the inserted proximal pin holder 32, while also permitting the insertion of the proximal pin holder 32 into the slot 44 without excessive force or damage to the parts.

In some embodiments, the retaining wall 42 is slightly angled or canted toward the proximal direction. In such embodiments, similar to as described above, a portion of the pin holder 32 can be inserted into the slot 44, e.g., the distal portion 36, but the proximal end of the pin holder 32 is prevented from being inserted into the slot 44 by the retaining member 42. In order to insert the remainder of the pin holder 32 past the retaining member 42, the user can, in addition to the techniques described above, press the proximal end of the pin holder 32 onto the angled retaining member 42. Due to the angle of the retaining member, a portion of the applied force will be translated into a force on the retaining member 42 in the proximal direction, which will compress or deflect the member 42 proximally away from its original position, and, in turn, overcome the interference. Once the interference is overcome, e.g., the retaining member 42 proximally compresses, deflects or bends proximally, the remainder of the proximal pin holder 32 can move past it and into the slot 44.

In the illustrated embodiment, the retaining member 42 is a retaining wall integrally-formed with the retaining arm 26. For example, if the retaining arm 26 (or the entire proximal handle 14) is molded, e.g., injection molded plastic, the mold can be configured to mold the retaining wall 42 therewith. Thus, the arm/handle and the pin retaining mechanism can be fabricated together in a single step. An integrally-formed retaining member requires no additional component parts to make and assemble. Thus, additional manufacturing steps and costs associated with adding a structure that substantially prevents the assembled proximal pin holder 32 from separating from the hack saw 10 are avoided.

As should be appreciated by those of ordinary skill in the pertinent art, the retaining member may take the form of any member capable of performing the function of the retaining wall as described herein. For example, the retaining member should be capable of, without limitation, resiliently compressing, elastically deforming, bending and/or deflecting away from an original position upon the application of force thereto to permit assembly of the proximal pin holder 32 to the proximal handle 14, and, upon termination of such force, return to the original position to establish an interference preventing removal/dislodgement of the pin holder 32 therefrom.

Conversely, as also should be appreciated by those of ordinary skill in the pertinent art, a separate, i.e., non-integrally formed, retaining member 42 may be used and secured within the retaining arm 26 via any of numerous different fixation means, such as, for example, welds, rivets, screws, nails, other fasteners and/or clips. It should be noted that in some such embodiments, the retaining member 42 need not be deflectable. The pin holder 32 may be inserted into the cavity 34, and then the retaining member 42 positioned and installed in the retaining arm 26 to provide the interference with the pin holder 32 and retain it in place. In some other such embodiments, the retaining member 42 can be removably attached, e.g., via screws, so that it can be detached to remove the pin holder 32, if desired.

In the illustrated embodiment, such as best shown in FIG. 3, the pin holder retaining arm 26 also includes an optional alignment member 45, including opposed projections 46, located within the slot 44, e.g., distally from the retaining member 42. Each projection 46 projects inwardly into the slot 44 from a respective sidewall 30a, 30b or from the base. The projections 46 are configured to align the assembled proximal pin holder 32 substantially parallel to the sidewalls 30a, 30b, so that a blade 100 mounted thereto will also be properly aligned. The projections 46 define a gap 47 therebetween, for receiving and stabilizing the proximal portion 40 of the pin holder 32 therein.

The gap 47 is sized and shaped to also substantially prevent rotation of the assembled proximal pin holder 32 when the proximal portion 40 thereof extends therethrough if it has a non-round shape, as in the illustrated embodiment. For example, when a blade 100 is mounted to the frame and tension is applied thereto, the non-round proximal portion 40 of the pin holder 32, e.g., square (as in the illustrated embodiment), rectangular, oval, polygonal, etc., extends through the gap 47 and is rotationally and laterally held by the projections 46. Thus, the pin holder 32 is substantially prevented from rotating or deflecting. This assists in mitigating the blade 100 from rotating or twisting during cutting. The gap 47 is sized and shaped, though, to permit rotation of the proximal pin holder 32 when the distal portion 36 of the pin holder 32 extends therethrough, either due to its dimensions, e.g., smaller than the gap, and/or has a substantially rounded shape. For example, during initial insertion of the pin holder 32 into the slot 44, the pin holder 32 may be rotated while the distal portion 36 extends through the gap 47, in order to properly orient the pin holder 32, prior to sliding the distal portion 36 into the cavity 34. Once aligned, the proximal portion 40 can be inserted into the gap 47 to hold the pin holder 32.

The alignment member 45 is positioned within the slot 44 such that the distance between the alignment member 45 and the retaining member 42 is at least the length of the proximal portion 40 of the pin holder 32. Thus, although the pin holder 32 is held laterally and rotationally by the projections 46, the pin holder 32 is proximally and distally moveable/slideable within the slot 44 through the gap 47. The alignment member 45 is also positioned such that the proximal portion 40 of the pin holder 32 extends through the gap 47, i.e., retained by the retaining member 45, when a blade 100 is mounted in the saw. The pin holder 32 can be moved sufficiently proximally, however, to remove the proximal portion 40 from the alignment member 45. With the proximal portion 40 removed from the alignment member, the pin holder 32 can be rotated because the distal portion 36 of the pin holder 32, which is located in the gap 47, does not inhibit rotation of the pin holder as described above. Thus, if the orientation of the inserted pin holder 32 requires rotational adjustment, e.g., to reorient the blade, the inserted pin holder 32 may be slid proximally toward the retaining member 42, such that the proximal portion 40 of the pin holder 32 exits the gap 47 and the distal portion 36 enters the gap 47. Thereafter the pin holder 32 may be rotated to the desired position, and then moved distally such that the distal portion 36 re-extends through the cavity 34 and the proximal portion 40 thereof can re-extend through the gap 47. The gap 47 may be sized to form a close or slight interference fit with the proximal portion 40 of the pin holder 32, such that friction retards unintentional sliding of the proximal portion 40 out of the retaining member 45.

As shown in FIG. 1, the distal portion 16 defines a distal pin holder cavity 48 adjacent the lower end thereof. The distal pin holder cavity 48 is located substantially along the same plane as the proximal pin holder cavity 34. Thus, the distal and proximal pin holder cavities 34, 48 are substantially aligned. The distal cavity 48 receives therethrough at least a portion of a distal pin holder 50, for mounting a distal end of a hack saw blade 100 thereto. The distal cavity 48 is sized and shaped to allow a portion of the distal pin holder 50 to extend therethrough.

In the illustrated embodiment, the distal pin holder 50 includes a threaded distal portion 52, having a nut 54, such as a wing nut, threaded thereon, a substantially rectangular middle portion 56, and a proximal semi-circular portion 58 having a blade mounting pin 60 projecting therefrom. In one embodiment, the distal pin holder cavity 48 is substantially rectangular and sized to allow passage therethrough of the distal and middle portions 52, 56 of distal pin holder 50. The cavity 48 however does not allow passage therethrough of the blade mounting pin 60. Thus, to assemble the distal pin holder 50 to the distal portion 16, the pin holder 50 is slid, distal portion 52 first, in a proximal to distal direction, through the cavity 48. Thereafter, the nut 54 is threaded onto distal portion 52. After the nut 54 is threaded onto the distal portion 52, the pin holder 50 can no longer slide proximally back out of the cavity 48 to dislodge, or otherwise separate, from the distal portion 16. Further, as the cavity 48 prevents passage therethrough of the mounting pin 60, the pin holder 50 cannot slide distally out of the cavity 48 to dislodge, or otherwise separate, from the distal portion 16. As the pin holder 50 cannot slide out of the cavity 48 from either end thereof, the pin holder 50 is retained with the distal portion 16. As should be understood by those of ordinary skill in the pertinent art, however, the portions 52, 56, 58 of the distal pin holder 50, and the distal pin holder cavity 48 may define any of numerous different corresponding shapes that will allow passage of at least part of the distal pin holder 50 through the cavity 48.

In some embodiments, the distal cavity 48 is also sized and shaped to substantially prevent rotation of the distal pin holder 50 while extending therethrough. Thus, in such an embodiment, the pin holder 50 must be separated from the distal portion 16 (i.e., by unthreading the nut 54 from the distal portion 52 and sliding the distal portion proximally out of the cavity 48), rotated, and then reassembled to the distal portion 16. In other embodiments, the distal pin holder 50 is configured to rotate without separation from the distal portion 16. One example of such a distal pin holder is disclosed in U.S. Patent Application entitled "Retained Aligning Rotating Hack Saw Blade Tensioning Mechanism and Related Method," incorporated by reference above. As should be understood by those of ordinary skill in the pertinent art, the distal pin holder 50 may alternatively take the form of any suitable, known or conventional pin holder.

In operation, a hack saw blade 100 is secured to the hack saw frame via the proximal and distal blade mounting pins 38, 50. As explained above, the proximal pin holder 32 is first assembled into the slot 44, e.g., during manufacture of the saw, by overcoming the interference of the retaining member 42. Once inserted, the distal portion 36 projects through the proximal cavity 34, and the proximal mounting pin 38 engages a proximal mounting aperture 62 of the hack saw blade 100 to connect the proximal side of the blade 100 to the hack saw frame. At the opposing distal end of the hack saw frame, the distal pin holder 60, projecting through the distal cavity 48, engages a distal mounting aperture 64 of the hack saw blade 100 to connect the distal side of the blade 100 to the hack saw frame. Tension is applied thereto as is known. In the illustrated embodiment, the nut 54 of the distal pin holder 50 can be tightened or threaded onto the distal pin holder 50, via rotation, to effect movement of the distal pin holder 50 in a distal direction to apply tension to the blade 100. The hack saw 10 is ready for use thereafter.

During use, the hack saw blade 100 may require adjustment or replacement. Thus, the blade 100 is removed from the frame. To do so, the tension applied to the blade 100 is released by unthreading the nut 54 until the blade 100 can be released from the mounting pins 38, 60. During adjustment/replacement of the blade 100, the proximal pin holder 32 is prevented from dislodging from the proximal handle 14 due to the interference created by the retaining member 42. Thereafter once the blade (or replacement blade) is reattached to the mounting pins 38, 60, tension can be re-applied as explained above. After use, the blade 100 may be removed from the hack saw frame, and the frame stored away. During storage, the proximal pin holder 32 will remain assembled to the proximal handle 14 due to the interference created by the retaining member 42 as well.

As may be recognized by those of ordinary skill in the pertinent art based on the teachings herein, numerous changes and modifications may be made to the above-described and other embodiments of the present invention without departing from the scope of the invention as defined in the appended claims. For example, the distal portion, elongated upper frame arm, and proximal handle may be formed of any of numerous different materials and may take any of numerous different configurations that are currently known or that later become known. For example, the distal portion may include a distal grip for manually gripping the distal portion during use. In addition, the saw blades associated with the disclosed hacksaws may take the form of any of numerous different types of saw blades that are currently known or that later become known. Accordingly, this detailed description of currently preferred embodiments is to be taken in an illustrative, as opposed to a limiting sense.

What is claimed is:

1. A hack saw comprising:
    a proximal end;
    a distal end; and
    a handle located at the proximal end of the hack saw and spaced apart from the distal end of the hack saw for mounting a hack saw blade therebetween, the handle comprising:
        a retaining arm located at a base end of the handle, the retaining arm comprising a proximal end, a distal end, and a proximal pin holder cavity defined in the distal end of the retaining arm and configured to allow a distal portion of a proximal pin holder to pass therethrough; and
        a proximal pin holder retaining member integrally formed with the retaining arm and proximally spaced apart from the proximal pin holder cavity such that the proximal pin holder retaining member is positioned between the proximal pin holder cavity and the proximal end of the retaining arm, the proximal pin holder retaining member and the proximal pin holder cavity defining a slot therebetween configured to receive a proximal portion of the proximal pin holder therein;
        wherein the proximal pin holder retaining member is at least one of resiliently movable and compressible from a first position to a second position proximally displaced from the first position such that at least a portion of the proximal pin holder retaining member is positioned closer to the proximal end of the retaining arm when the proximal pin holder retaining member is in the second position, and wherein the proximal pin holder retaining member prevents removal of the proximal portion of the proximal pin holder from the slot when the proximal pin holder retaining member is in the first position.

2. A hack saw as defined in claim 1, wherein a length of the slot from the proximal pin holder retaining member to the proximal pin holder cavity is less than a length of the proximal pin holder from a proximal end to a distal end of the proximal pin holder.

3. A hack saw as defined in claim 1, wherein the proximal pin holder retaining member prevents full insertion of the proximal portion of the proximal pin holder into the slot when the proximal pin holder retaining member is in the first position, and wherein the proximal pin holder retaining member allows full insertion of the proximal portion of the proximal pin holder into the slot when the proximal pin holder retaining member is in the second position.

4. A hack saw as defined in claim 3, wherein the proximal pin holder retaining member is the at least one of resiliently movable and compressible from the first position to the second position upon application of a force thereto within a range of 2 to 20 pounds.

5. A hack saw as defined in claim 1, wherein the handle further comprises a hand grip and a hand guard distally spaced apart from the hand grip, and wherein the hand grip and the hand guard are connected to one another by the retaining arm.

6. A hack saw as defined in claim 1, wherein the retaining arm comprises a pair of opposing sidewalls extending from a base of the retaining arm and defining a cavity therebetween, and wherein the proximal pin holder retaining member at least one of (i) extends from one of the sidewalls toward the other sidewall and (ii) extends from the base.

7. A hack saw as defined in claim 1, wherein the proximal pin holder retaining member comprises a retaining wall located within a cavity of the retaining arm.

8. A hack saw as defined in claim 1, wherein the proximal pin holder cavity is configured to prevent the proximal portion of the proximal pin holder from passing therethrough.

9. A hack saw as defined in claim 6, wherein the handle further comprises an alignment member located within the slot between the proximal pin holder retaining member and the proximal pin holder cavity and configured to align the proximal pin holder in a direction substantially parallel to the sidewalls of the retaining arm, and wherein a distance between the alignment member and the proximal pin holder retaining member is equal to or greater than a length of the proximal portion of the proximal pin holder.

10. A hack saw as defined in claim 9, wherein the alignment member comprises a pair of opposing projections projecting from respective opposing sidewalls of the retaining arm inwardly into the slot and defining a gap therebetween configured to receive the proximal pin holder therein.

11. A hack saw as defined in claim 10, wherein the gap is configured to substantially allow rotation of the proximal pin holder when the distal portion of the proximal pin holder is located therein and to substantially prevent rotation of the proximal pin holder when the proximal portion of the proximal pin holder is located therein.

12. A hack saw as defined in claim 1, further comprising the proximal pin holder and a distal pin holder.

13. A hack saw as defined in claim 12, further comprising a hack saw blade mounted to the proximal pin holder and the distal pin holder.

14. A hack saw comprising:
a proximal end;
a distal end; and
a handle located at the proximal end of the hack saw and spaced apart from the distal end of the hack saw for mounting a hack saw blade therebetween, the handle comprising:
a retaining arm located at a base end of the handle, the retaining arm comprising a proximal end, a distal end, and a proximal pin holder cavity defined in the distal end of the retaining arm and configured to allow a distal portion of a proximal pin holder to pass therethrough; and
a proximal pin holder retaining member secured to the retaining arm and proximally spaced apart from the proximal pin holder cavity such that the proximal pin holder retaining member is positioned between the proximal pin holder cavity and the proximal end of the retaining arm, the proximal pin holder retaining member and the proximal pin holder cavity defining a slot therebetween configured to receive a proximal portion of the proximal pin holder therein;
wherein the proximal pin holder retaining member is resiliently deflectable from a first position to a second position proximally displaced from the first position such that at least a portion of the proximal pin holder retaining member is positioned closer to the proximal end of the retaining arm when the proximal pin holder retaining member is in the second position, and wherein the proximal pin holder retaining member prevents removal of the proximal portion of the proximal pin holder from the slot when the proximal pin holder retaining member is in the first position.

15. A hack saw as defined in claim 14, wherein the proximal pin holder retaining member is integrally formed with the retaining arm.

16. A method comprising:
providing a hack saw frame comprising a proximal end, a distal end, and a handle located at the proximal end of the hack saw frame and spaced apart from the distal end of the hack saw frame for mounting a hack saw blade therebetween, the handle comprising:
a retaining arm located at a base end of the handle, the retaining arm comprising a proximal end, a distal end, and a proximal pin holder cavity defined in the distal end of the retaining arm; and
a proximal pin holder retaining member integrally formed with the retaining arm and proximally spaced apart from the proximal pin holder cavity such that the proximal pin holder retaining member is positioned between the proximal pin holder cavity and the proximal end of the retaining arm, the proximal pin holder retaining member and the proximal pin holder cavity defining a slot therebetween;
passing a distal portion of a proximal pin holder through the proximal pin holder cavity, the proximal pin holder comprising a blade mounting pin projecting from the distal portion thereof;
moving or compressing the proximal pin holder retaining member from a first position to a second position proximally displaced from the first position such that at least a portion of the proximal pin holder retaining member is positioned closer to the proximal end of the retaining arm; and
inserting a proximal portion of the proximal pin holder into the slot.

17. A method as defined in claim 16, further comprising allowing the proximal pin holder retaining member to return to the first position, such that the proximal pin holder retaining member prevents removal of the proximal portion of the proximal pin holder from the slot.

18. A method as defined in claim 16, further comprising:
assembling a distal pin holder to the distal portion of the hack saw frame, the distal pin holder comprising a blade mounting pin projecting from a proximal portion thereof;
mounting a hack saw blade to the hack saw frame via engagement with the blade mounting pin of the proximal pin holder and the blade mounting pin of the distal pin holder; and
applying tension to the hack saw blade.

19. A method as defined in claim 18, further comprising substantially preventing at least one of the proximal pin holder and distal pin holder from rotating.

20. A method as defined in claim 16, wherein the proximal pin holder retaining member comprises a retaining wall located within a cavity of the retaining arm.

21. A method as defined in claim 16, wherein moving or compressing the proximal pin holder retaining member from the first position to the second position comprises manually moving or compressing the proximal pin holder retaining member with a user's finger or a tool.

22. A method as defined in claim 16, wherein moving or compressing the proximal pin holder retaining member from the first position to the second position comprises pressing a proximal end of the proximal pin holder against the proximal pin holder retaining member.

23. A hack saw as defined in claim 1, further comprising the proximal pin holder, wherein the distal portion of the proximal pin holder has a rounded shape, wherein the proximal portion of the proximal pin holder has a rectangular shape, and wherein the proximal pin holder cavity has a rectangular shape.

24. A hack saw as defined in claim 1, wherein the proximal pin holder retaining member is angled toward the proximal end of the retaining arm.

* * * * *